Nov. 29, 1932. H. A. W. WOOD 1,889,459
FOLDING MACHINE
Original Filed June 12, 1928 9 Sheets-Sheet 3
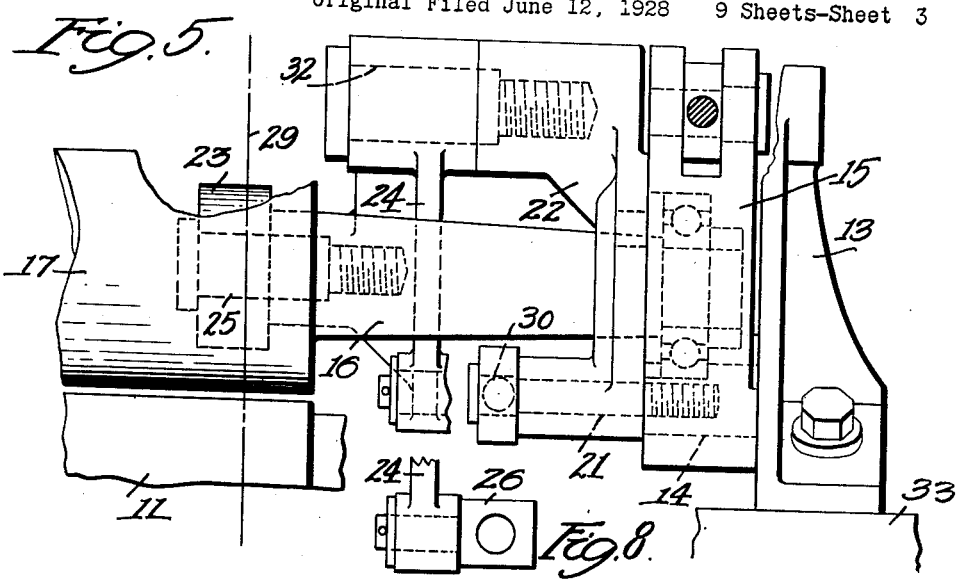
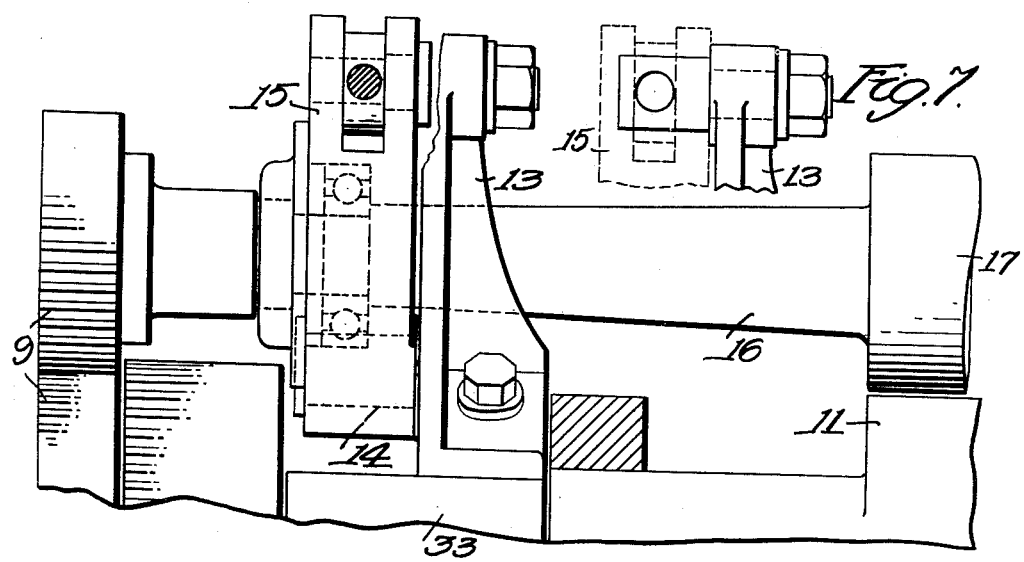
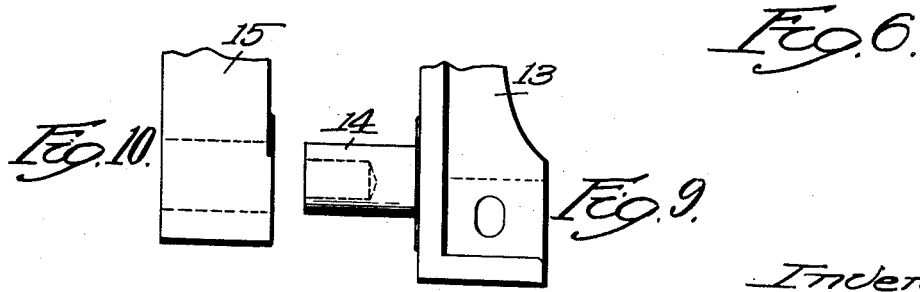
Inventor
H. A. W. Wood
by attorneys
Southgate Fay & Hasley
Witness
C. F. Nixon

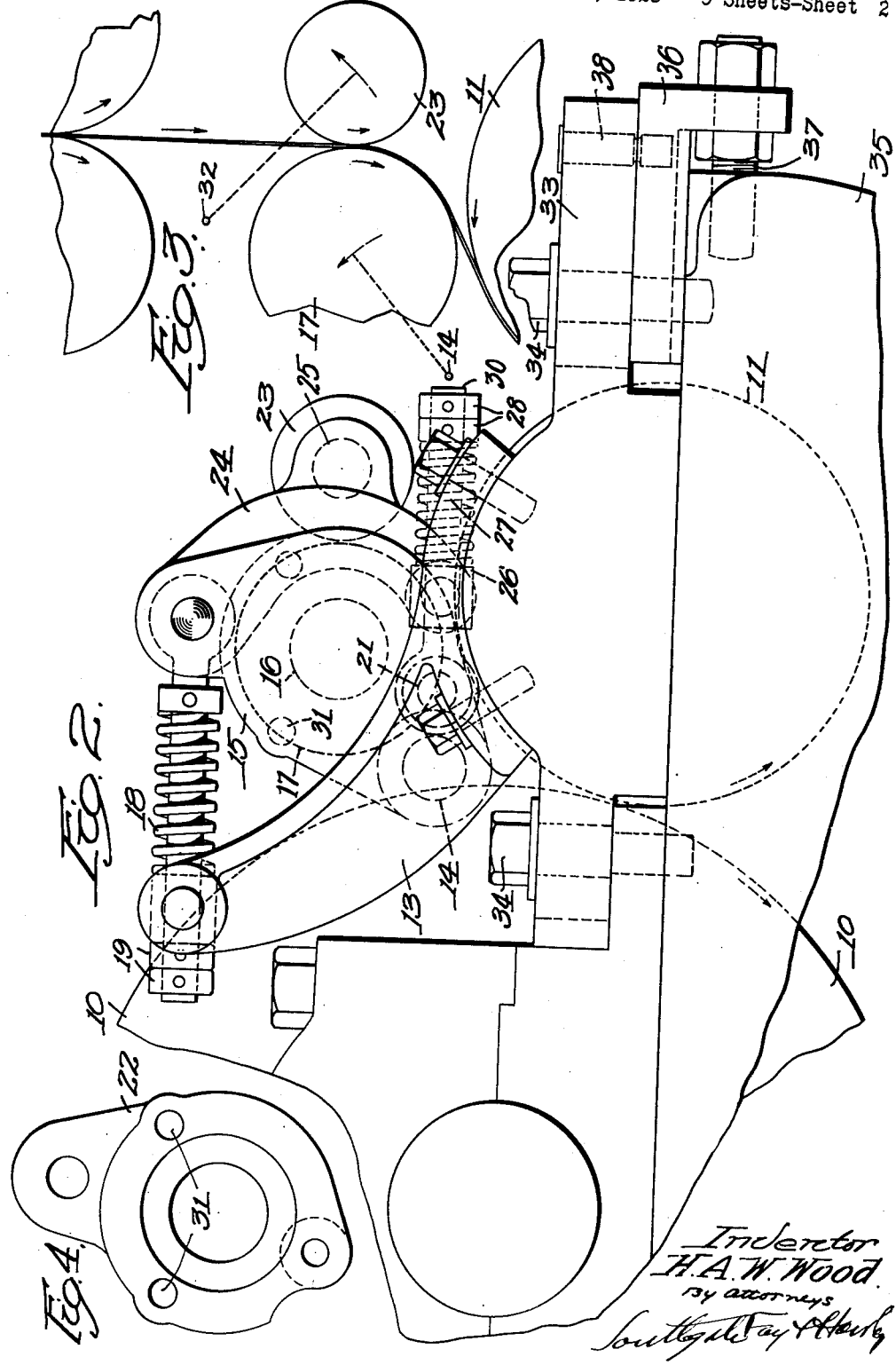

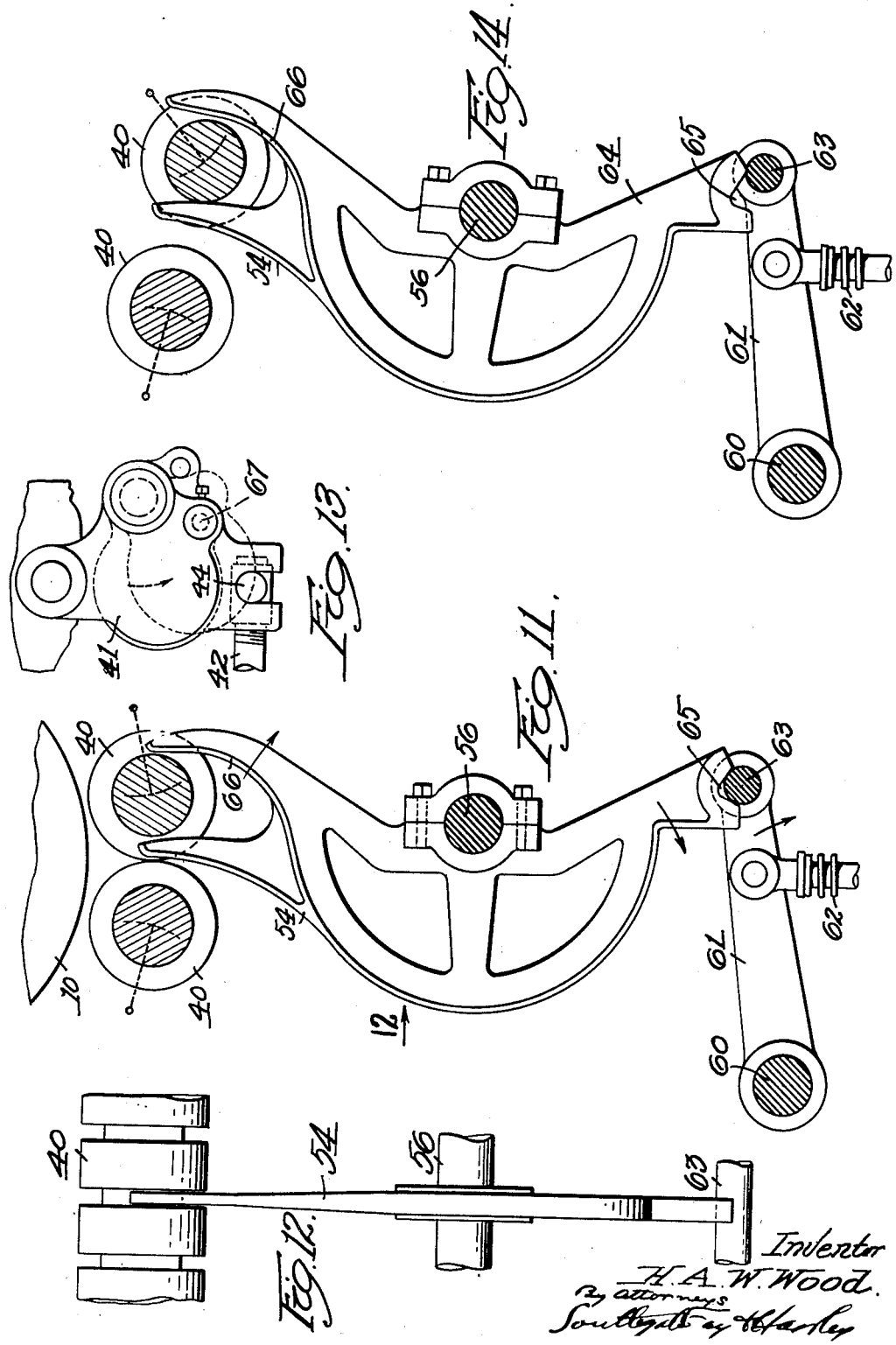

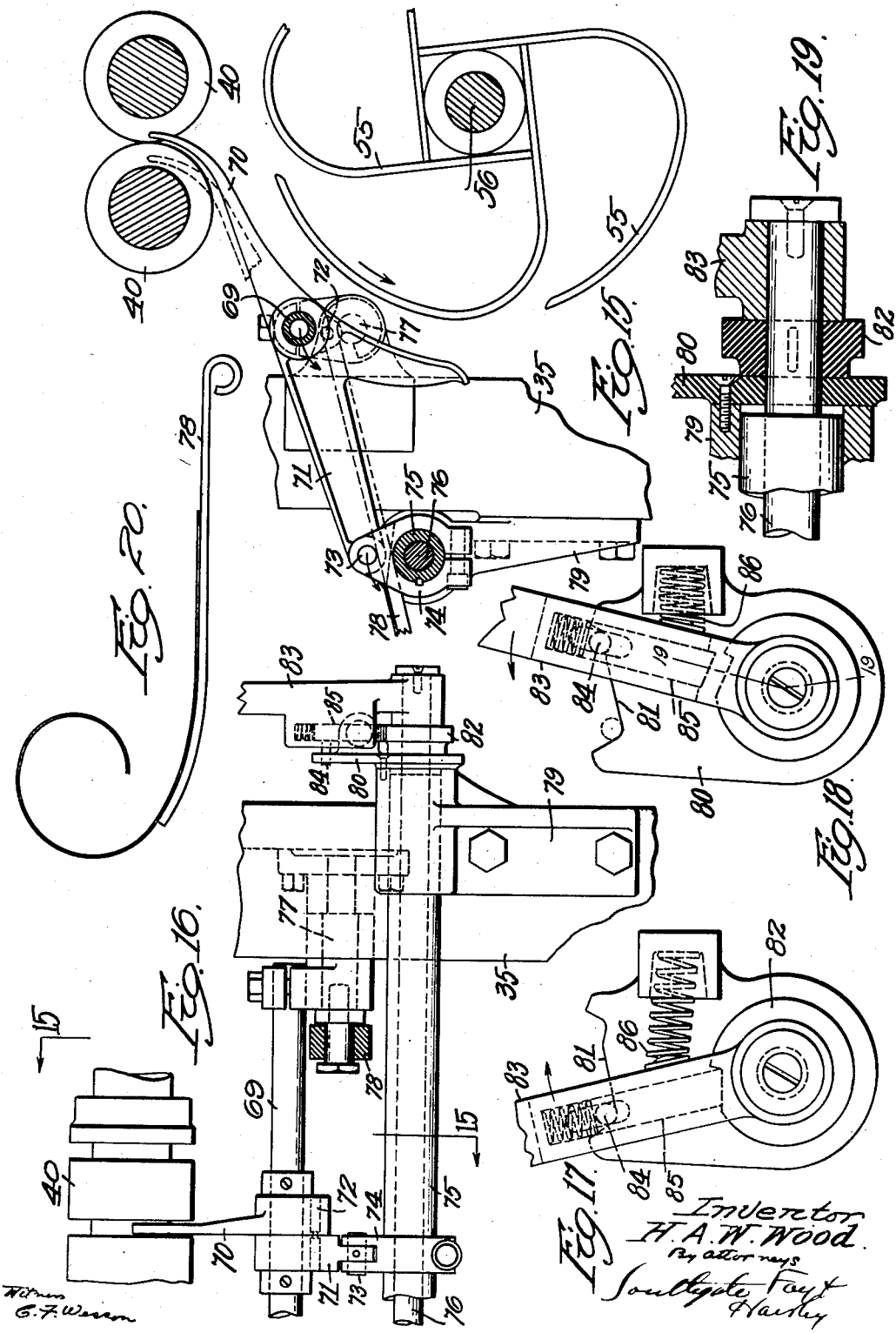

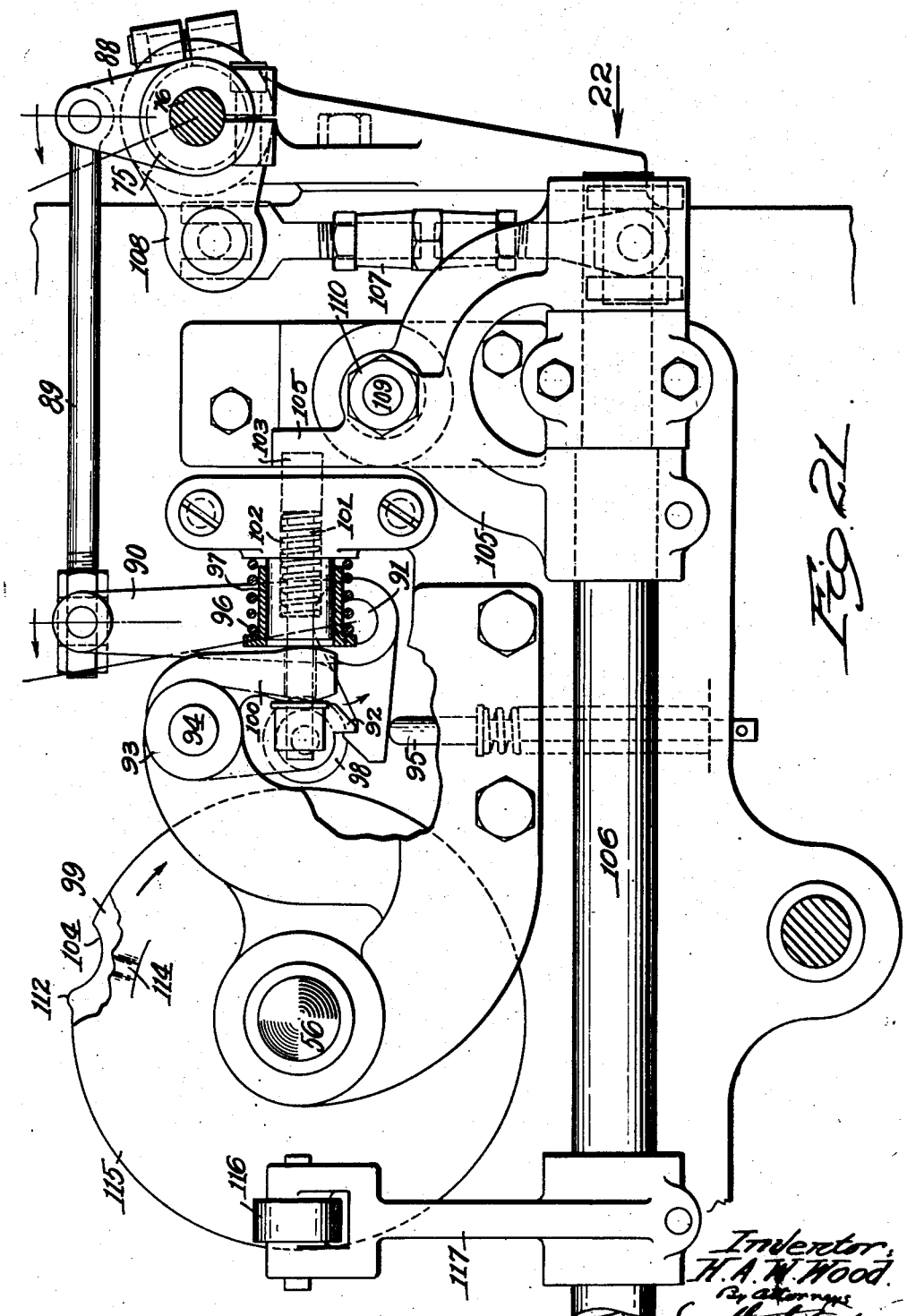

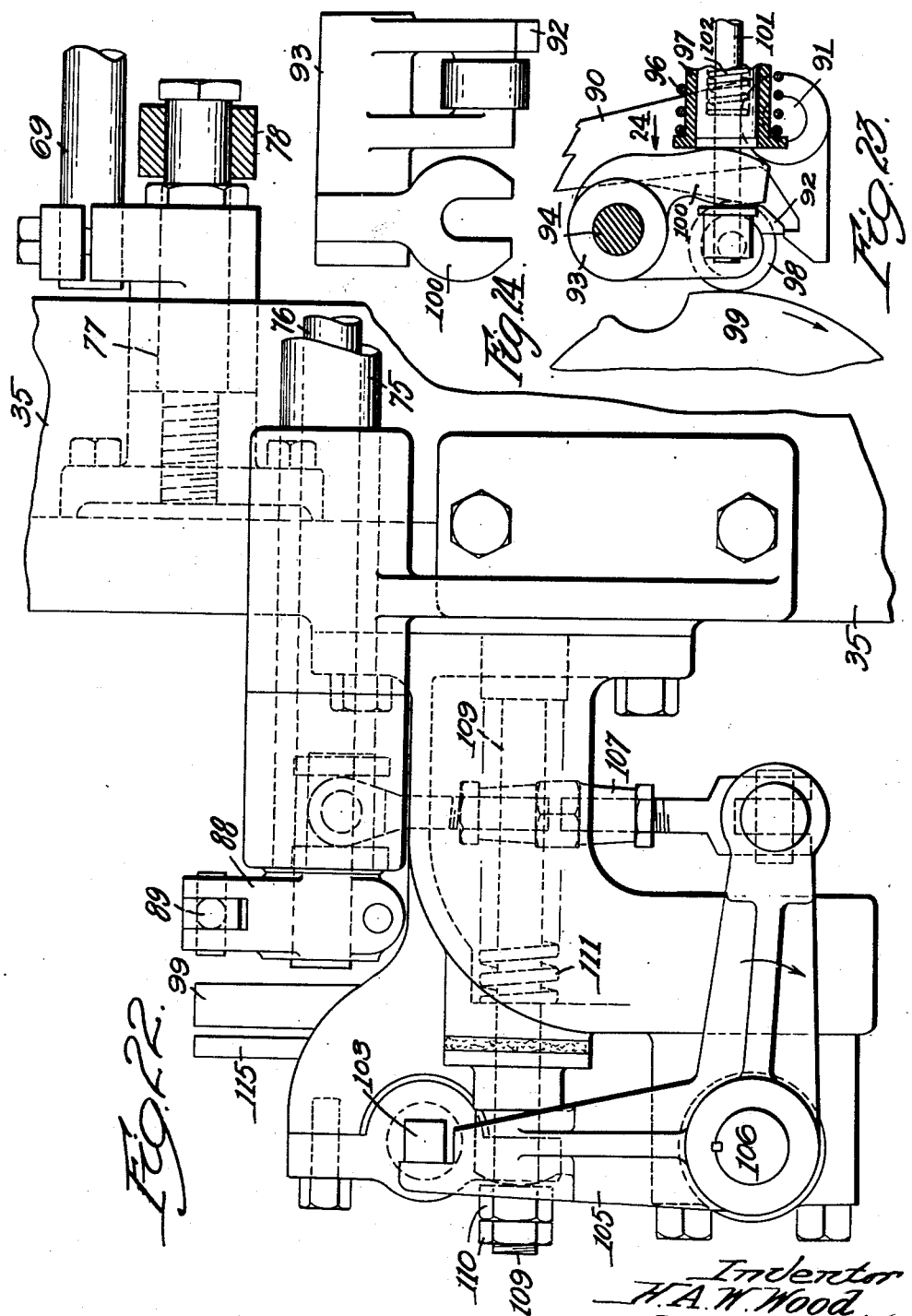

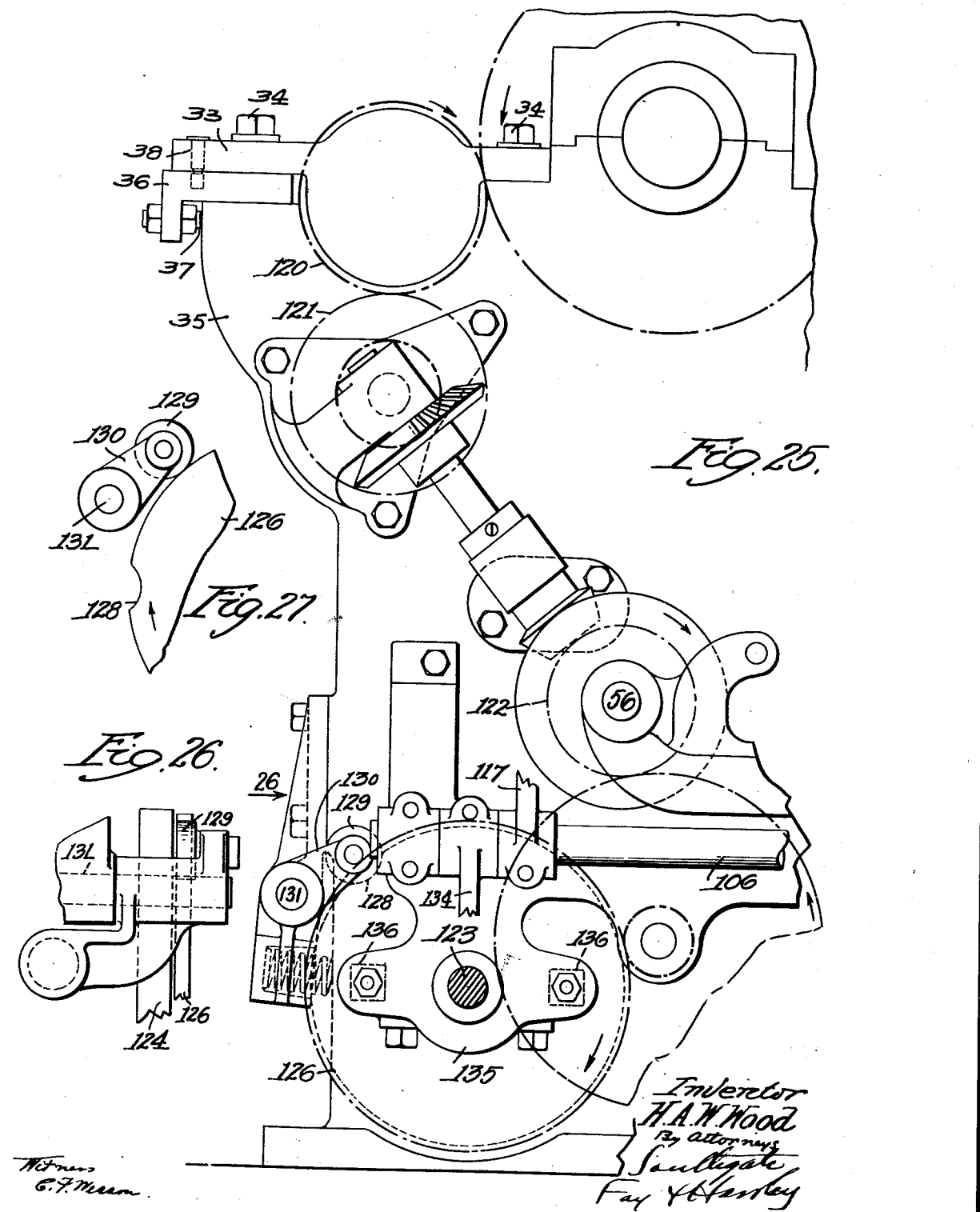

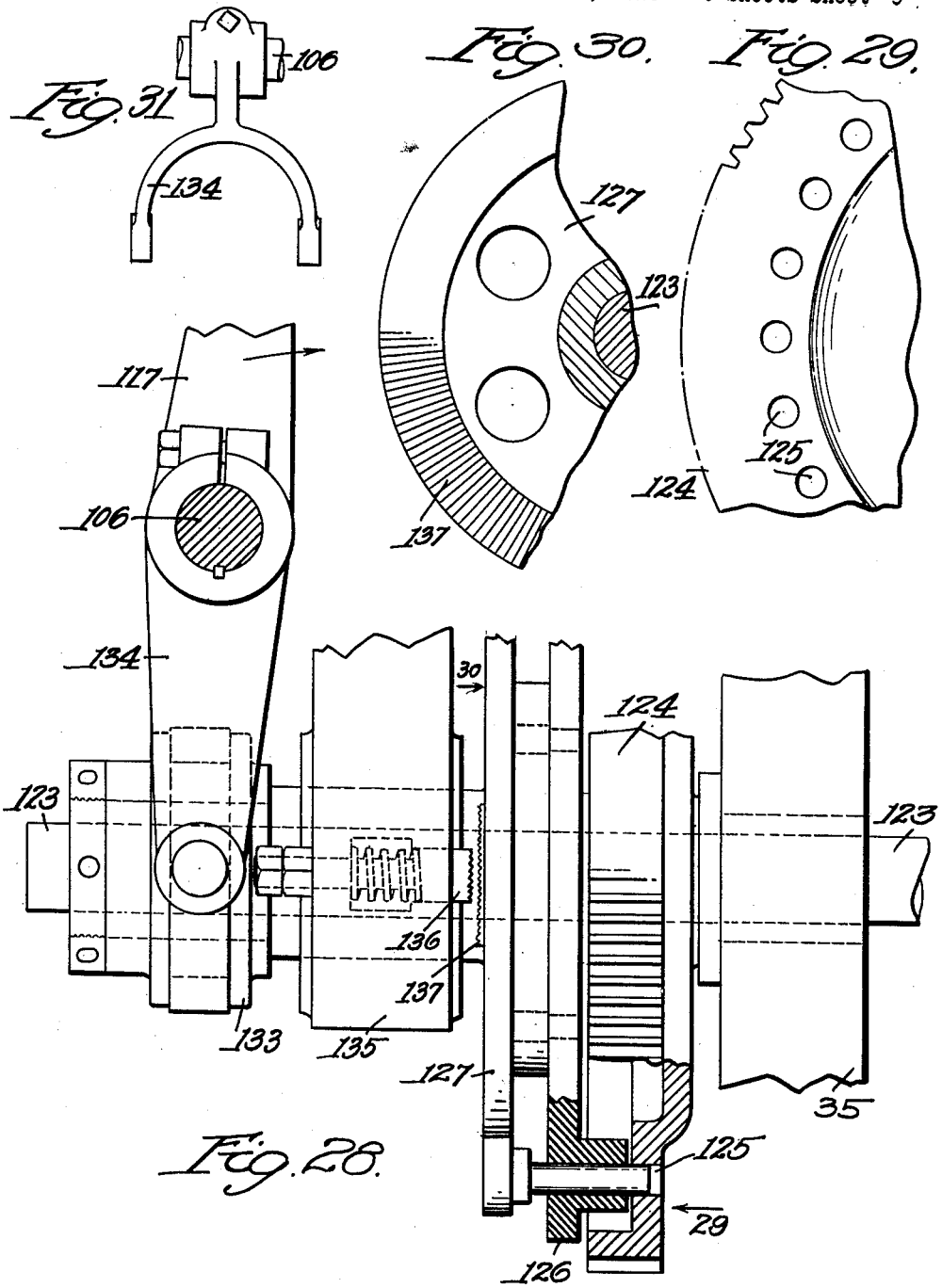

Patented Nov. 29, 1932

1,889,459

UNITED STATES PATENT OFFICE

HENRY A. WISE WOOD, OF NEW YORK, N. Y., ASSIGNOR TO WOOD NEWSPAPER MACHINERY CORPORATION, OF NEW YORK, N. Y., A CORPORATION OF VIRGINIA

FOLDING MACHINE

Application filed June 12, 1928, Serial No. 284,728. Renewed November 5, 1931.

This invention relates to a folder for newspapers and other printed products and to its association with the counter and other features.

The principal objects of the invention are to provide means in cooperation with the self-clearing folding roller to adapt it to move out of the way in case of a choke with means for moving the S-shaped guides which direct the paper into the fans so as to avoid any chance of the choke failing to clear itself at this point; to provide means for operating said guide automatically when the folding roller moves out of position and opening the space through which the choke of papers will clear itself; to provide means for easily and conveniently restoring the guide to normal position and latching it in place ready for further production; to provide a paper throw-out and improved means for operating it by an actuating arm in such a way that the means for operating the throw-out will be kept out of engagement with the cam under normal conditions and prevent it from falling into the notch at every revolution of the fan shaft; to provide means whereby a roller is adapted to be released by operating a hand lever so as to be in a position to fall into the notch on the cam shaft to throw out the paper at a predetermined time; to provide a simplified means on the face of the cam itself preferably for automatically returning it into the control of its latch and held in that position while the machine is operating normally; to provide an improvement in the operation of the pinching roller which cooperates with one of the folding rollers to flatten out the fold in the edge of the paper and to provide improvements in the features of construction of the parts for operating these various elements.

Other objects and advantages of the invention will appear hereinafter.

Reference is to be had to the accompanying drawings in which

Fig. 2 is a side view on enlarged scale showing the details of the pinching roll supporting and operating mechanism;

Fig. 3 is a diagrammatic view of corresponding parts;

Fig. 4 is a side view of the pinching roll lever bracket;

Fig. 5 is an elevation of the means for supporting the yielding roll and the pinching roll at one end;

Fig. 6 is a similar view of the other end of the machine showing the means for supporting the yielding roll at that end;

Fig. 7 is a view of a spring-block to complete the showing in Fig. 6;

Fig. 8 is a corresponding view of a block on the other end of the machine supplementing the showing in Fig. 5;

Fig. 9 is a side view of the yielding roll bracket support;

Fig. 10 is a corresponding view of the yielding roll bracket adapted to be carried on said support;

Fig. 11 is an end view of the paper guide leading to the fan shown in normal position;

Fig. 12 is an edge view of the same taken in the direction of the arrow 12 in Fig. 11;

Fig. 13 is an end view of one of the folding roll supports shown in Fig. 1 but on larger scale;

Fig. 14 is a view like Fig. 11 but showing the parts operated to remove the paper guide from its normal place and clear the choke;

Fig. 15 is an end view of the fan showing the throw-out paper guide in two positions in full and dotted lines;

Fig. 16 is an elevation of the same;

Fig. 17 is an end view of the ratchet mechanism for operating the throw-out paper guide;

Fig. 18 is a similar view showing it in another position;

Fig. 19 is a sectional view on the line 19—19 of Fig. 18;

Fig. 20 is a side view of the throw-out paper guide by itself;

Fig. 21 is a side view of the paper throw-out cam and associated parts;

Fig. 22 is an edge view of the same;

Fig. 23 is a fragmentary view of part of

Figure 1:
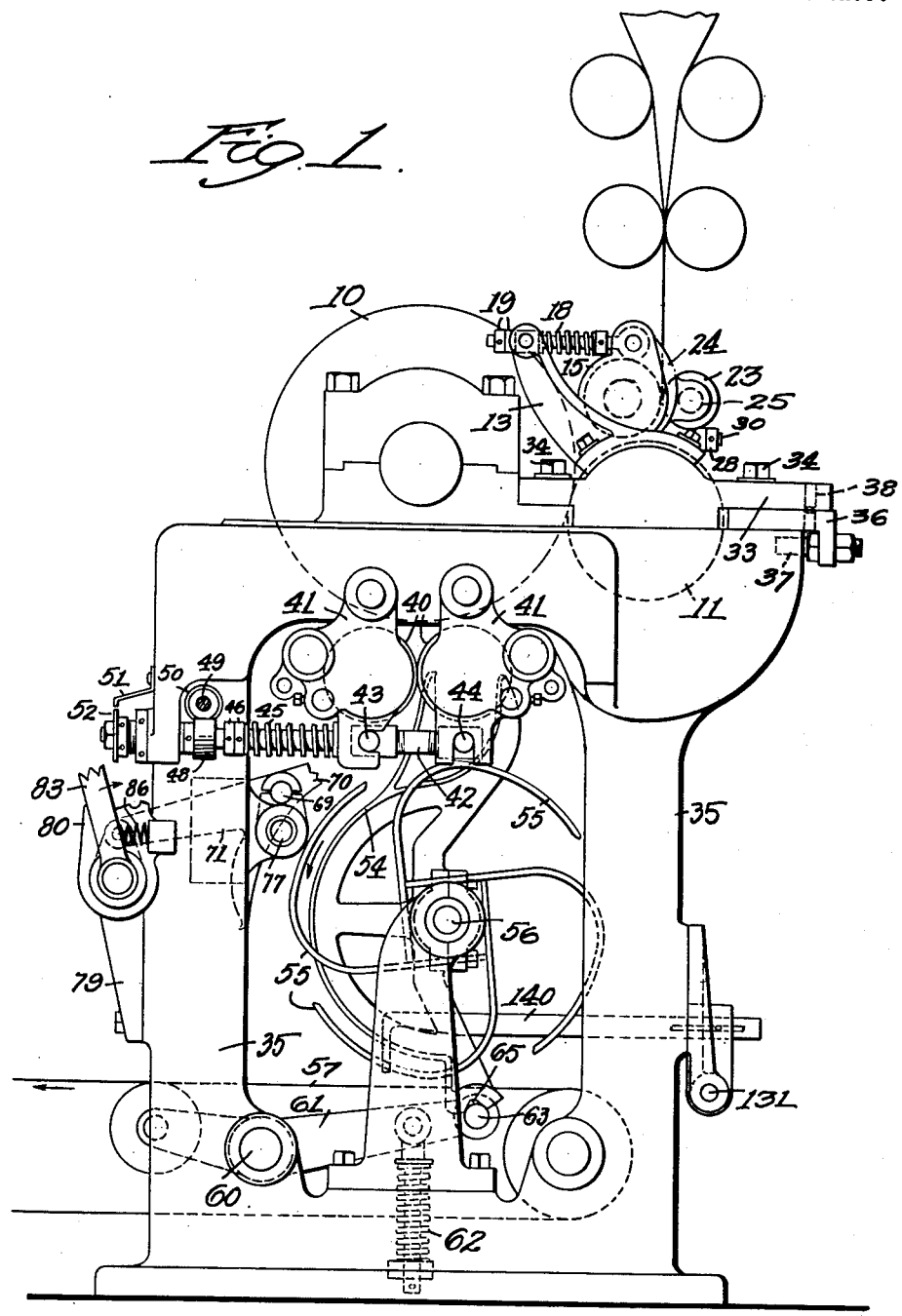
Fig. 1 is a side view of a folding machine showing a preferred embodiment of this invention applied thereto with some of the parts in simplified or diagrammatic form.

Fig. 21, showing the parts in a different position;

Fig. 24 is a view taken at right angles to Fig. 23 of the lever carrying the cam roll;

Fig. 25 is an end view showing the gearing for operating the counter mechanism;

Fig. 26 is a fragmentary side view of a feature of the counting mechanism looking in the direction of the arrow 26 in Fig. 25;

Fig. 27 is a fragmentary view of the counter cam showing the associated parts;.

Fig. 28 is a side view of the counter disc and operating parts;

Fig. 29 is an end view of the counter gear looking in the direction of the arrow 29 in Fig. 28;

Fig. 30 is a fragmentary end view showing the brake disc of the counter looking in the direction of the arrow 30 in Fig. 28, and Fig. 31 is an end view of the brake operating yoke.

This invention is designed for use in connection with folding machines known in the newspaper producing art and in fact capable of use in connection with any printing machine in which webs are fed to the folding couple and products having a large number of sheets are produced. It is shown as applied to a folder of an ordinary newspaper press in which the folded sheet runs from the former to the cutting and folding cylinders. When it is desired to collect or superimpose one product upon another, the pins on the cutting cylinder are put into operation so that they pick up the first section or product that comes along and carry it around the cutting cylinder and superimpose on it the following section.

This invention involves some improvements over the means for supporting the yielding roller and pinching roller shown in my prior application, Serial No. 256,712, filed February 24, 1928.

Referring to the accompanying drawings I have shown a folding couple consisting of the usual folding cylinder 10 and cutting and collecting cylinder 11. These have their respective pins which work practically in the usual way.

In order to accomplish several of the objects above mentioned, I pivot on supports 13, on the folder frame by studs 14, two end brackets 15. The brackets 15 carry by ball bearings, journals 16 on which is a roll 17 extending across the machine. These brackets 15 normally are forced downward by springs 18 against stop-nuts 19. This yielding roll 17 is placed in such position that the web or section of paper coming down from the former folder above will be directed out from a direct path therefrom to the folding couple, as shown in Fig. 3 and as in said pending application. It assumes a path of travel in which it is considerably wrapped about the cutting and collecting cylinder 11. This roller needs no other operation or attention, being forced yieldingly into place and capable of moving backwardly against the springs whenever special resistance is encountered. The roller 17 is driven by gears 9 from the shaft of the cutting cylinder 11.

I have shown, on one of the same brackets 15, the means for forming the crease, although it could be placed at any other convenient position. This takes the form of a stud 21 secured in one bracket 15 and carrying a pivoted bracket 22 which carries on a stud 32, a pivoted lever 24 on which is a creasing roller 23 mounted on a stud 25 carried by this lever 24. The journal 16 passes through a central opening in the bracket 22, and pins are inserted in holes 31, so that this bracket 22 moves with the bracket 15.

This lever 24 is provided at its end with a rocking spring block 26, through which passes a rod 30 pivoted on the stud 21 and on which is a coil spring 27 bearing at one end on nuts 28 on the rod. The other end of the spring bears on the block 26. The spring forces the lever 24 forward in such position as to press the pinching roll 23 against the yielding roll 17 at all times. The pinching roll 23 comes at a point on the roll 17 to engage the folded edge of the paper indicated by the line 29 in Fig. 5, so as to crease that edge and prevent a rounded fold being formed. The object is the same as in my above mentioned application but this construction permits of the mounting of the roll 17 in ball bearings and the holding of the lever 24 by the spring 27 as stated.

The roll bracket supports 13 are made alike except for the position of the ball bearings and are bolted on plates 33 at the two ends of the machine. These plates are provided with elongated openings through which bolts 34 pass into the frame 35 of the folder and permit of the adjustment of these plates 33 which carry the bearings for the cutting cylinder 11. An adjustment is provided for each plate 33 by means of a slide 36 mounted on the frame 35, adjustable out and in by a bolt 37 and nuts. Each plate 33 is secured to the slide 36 by a shear pin 38 which, when a choke occurs, will break and allow the plate 33 to move back, taking with it the cutting cylinder 11. The bolt 34 is merely to hold this plate down and prevent any chattering or vibration, but it is not screwed up tight enough to prevent the above mentioned motion of this plate.

I have shown the folding rolls 40 as mounted in pivoted brackets 41 adapted to swing from a center overhead and adapted to be adjusted by right and left hand screws 42. This screw is provided with studs 43 and 44 engaging in slots in the brackets 41, one of these slots being vertical and the other horizontal. A spring 45 on the bolt 42 forces the two rolls 40 together with spring pressure under the adjustment of nuts 46 as shown in my previous application, Serial No. 266,229, filed March 31, 1928.

I have also shown a worm-wheel 48 and shaft 49 having a worm 50 thereon for turning this wheel in each case, and a pointer 51 and rotary dial 52 for showing the adjustment. It will be understood that this shaft 49 provides for the adjustment of the rolls at both ends, but no claim is made to these features herein as they are claimed in my last named companion application.

As the product comes down between the rolls 40 it engages a set of guides 54 which guide it into the vanes of the delivery fan 55 which is on the fan shaft 56 and the papers come down through on the outside of the guide 54 to the delivery belts 57.

In case of a choke the construction shown in my prior Patent No. 1,762,286 involves stationary guides in the position of the guides 54, and therefore it is possible for the choke to be large enough to still cause trouble at this point. This invention involves the making of these guides 54 movable and capable of moving out of the way automatically under the influence of a choke of papers. For this reason on a shaft 60 is pivoted a lever 61 yieldingly held up by a spring 62 and carrying a rod 63 which extends across the machine and is supported by a similar lever on the other end. The guides 54 are mounted on frames 64 which are mounted to swing freely on the shaft 56.

It will be seen also that the guides 54 are bifurcated and provided with a set of projections 66, the space between which and the upper part of the guide 54 straddles the journal of one of the rolls 40 so as to be pushed back with the roll when that is forced back on fracturing its shear pin 67. This position is shown in Fig. 14. This opens the space in front of the guides 54 through which the choke will clear itself.

These frames 64 are provided with notches 65 which normally engage the rod 63, as shown in Fig. 11. There are two or more of them across the machine. The two springs 62, therefore, in the position shown in Fig. 11, hold up the rod 63 in the notches 65 and keep the parts in the position shown in that figure until a choke occurs. If the guides 54 are forced back the slanting edges of the notches 65 will slide over the rod 63 to the position shown in Fig. 14. This causes the guides 54 to be moved out of the way by the choke of papers, and thus avoid breaking the parts of the machine. When the folding roll is restored to position, the notches 65 can be latched over the rod 63 in proper position ready for the machine to continue to operate.

In the last named of my above mentioned applications I have shown and described a throw-out device and connections therewith whereby when papers are thrown out by it the counter will be prevented from operating and the throwing out of the papers will not interfere with the accuracy of the count. I have shown here certain improvements thereon as follows:

Free on a shaft 69 are a set of throw-out levers 70. Also on the shaft 69 are arms 71 free to turn on this shaft and connected with the throw-out levers by frangible pins 72. The arms 71 extend backwardly and are connected by studs 73 with clamps 74, each of which is fixed to a tube 75 so as to turn herewith. This tube is centered and supported by a cross shaft 76. The shaft 69 is mounted to turn on centers 77 and the four members 69, 77, 73 and 76 are located substantially in the form of a parallelogram so as to give a parallel motion to the levers 70 when the tube 75 is turned on its axis. The throw-out levers 70 receive the papers from the rolls 40 and they move out on the throw-out guides 78 which are hooked over the studs 77 and extend outwardly as will be seen by comparison of Figs. 15 and 20.

The tube 75 is supported in a bracket 79 fixed to the frame 35 and having a cylindrical hub thereon in which this tube has a bearing. Fixed to this hub is a stationary cam 80 having an inclined surface 81 and provided with a depression at its upper end. Keyed to the shaft 76 is a ratchet member 82 having one tooth.

Rotatably mounted on the shaft is a handle lever 83 having a spring-pressed cross pin 84 for cooperation with the cam surface 81. This pin is connected by a slot with a latch 85 for engaging the tooth in the ratchet member 82. When the handle is turned from the position shown in Fig. 17 to that shown in Fig. 18 the pin 84 will ride up the incline and draw the latch 85 out of the ratchet tooth compressing a spring 86 and at the top of the incline the pin 84 will be received in the depression but the spring 86 immediately forces the handle back. This, it will be seen, has no effect on the tube 75.

During the first part of the swinging motion of the handle 83 the latch 85 engages the tooth in the ratchet 82 and turns that ratchet, which is pinned or otherwise fixed to the shaft 76, which is free within the tube 75. The shaft 76 has fixed to its end an arm 88 which is connected by a link 89 adjustably with a cam latch 90 pivoted on a stud 91. The other arm of this latch 90 has a tooth which projects under a tooth 92 on a lever 93 which is pivoted on a rod 94. A spring-pressed plunger 95 presses upwardly on the lower arm of the latch or lever 90 and normally forces the latter back from the position indicated in Fig. 23 to the position shown in Fig. 21 and restores the ratchet 82 to its original position as shown in Fig. 17. However, this plunger having been pushed down and the tooth 92 carried as above stated, the lever 93 is free to be swung to the left in Fig. 23 by a spring 96 on a sleeve 97 so as to bring a roll 98 carried by one arm of the lever 93 against a cam 99 mounted on the fan shaft 56. This is the paper guide operating cam.

A bracket 141 secured to the frame of the machine carries a stationary cylindrical hub 142 on which slides the sleeve 97.

The sleeve 97 acts on a bifurcated arm 100, forming a part of the lever 93. Through the bifurcation of this arm extends a rod 101. This rod 101 has a spring 102 with its end located in a recess in the hub 142, for pulling back and on the end has a latch 103. This movement of the latch up to this time does not have any other effect, but the latch 103 is later pulled away from the latch lever 105.

Now as the shaft 56 with the cam 99 turns in the direction of the arrow in Fig. 21, it will bring a notch 104 into registration with the roll 98 and the roll will drop into it instantaneously which will pull the latch 103 out from in front of a latch lever 105 so as to release the same. This latch lever is fixed on a shaft 106 and the other arm of the lever is connected by a turn-buckle 107 and other parts constituting a link with an arm 108, which is fixed on the sleeve 75. Connected with the upper or vertical arm of the latch lever 105 is a rod 109, the connection being adjustable by means of nuts 110.

This rod is provided with a spring 111 which, on account of the connection of the rod with the lever by the bearing of the same on the nuts 110, normally tends to pull the lever over in the direction of the arrow on the lower arm of the lever 105 in Fig. 22. Therefore, the releasing of the latch 103 will turn the tube 75. The turning of this tube swings the arm 74 and thus moves the throw-out paper guide 70 downwardly to the full line position in Fig. 15. The timing is such that this throw-out guide sets in this position long enough for two papers to be thrown out on the guide 78 and then moves back.

As soon as the roll 98 enters the notch 104 the cam 99, rotating constantly, pushes it out again and brings it under the influence of a hump 112 on the edge of the cam which forces the roll 98 back beyond the surface of the cam to the position shown in Fig. 21. This forces the latch 103 yieldingly against the face of the latch lever 105 and when this latch lever is turned back again, the latch will spring by it into the position shown in Fig. 22.

The means for controlling the number of papers thrown out while these operations are taking place consists of a hump 114 on the face of the paper throw-out latch cam 115 which is also on the shaft 56. From about the position indicated in Fig. 23 until this hump 114 gets around to the opposite side of the shaft 56 is one-half a revolution of this shaft which, in the type of folder chosen for illustrating this invention, will accomplish this result as four papers are turned per revolution of this shaft. At this time the hump 114 engages a roll 116 on a rocking lever 117 which is fixed on the shaft 106 and a slight rocking of this shaft turns the ratchet lever 105 which is keyed to the other end of this shaft and moves it back so the latch 103 can slip by it.

It will be seen that the moving back of the lever 93 will allow the cam roll latch 90 to swing back to the position shown in Fig. 21, forced thereby the spring plunger 95, which will restore the ratchet 82 to the position shown in Fig. 17.

In order to prevent the operation of the counting mechanism when papers are thrown out as above described and thereby keep the counting rectified all the time, the following mechanism is provided: With the gear 120 on the cutting cylinder of the folding couple meshes a gear 121 which, by means of bevel gearing drives the fan shaft 56. On this shaft is a gear 122 which, through suitable gearing, drives the counter-shaft 123. Keyed to the counter-shaft is a gear 124 having a series of perforations 125 equally spaced apart therearound. Free on the shaft 123 is a counter disc 126 which has a boss perforated to register with the circle of perforations 125. Also free on the shaft 123 is a brake disc 127 having a pin projecting through the passage in the boss in the counter disc and adapted to be projected into any one of the holes 125, so that these three elements 124, 126 and 127 will be positively connected with the shaft 123.

The counter disc is provided with the usual depression 128 for allowing a roll 129 on a counting arm 130 to move once during a revolution of the counter disc 126 and register the desired number of papers as for example, fifty. The counter arm 130 oscillates a shaft 131 which operates a kicker 140 to separate one pile of papers from the next. As will be seen, however, this counting is not necessarily exactly controlled by the rotations of the shaft 123 or the fan shaft 56.

Slidably mounted on the shaft 123 is a head 133 carrying the brake disc 127 at one end. The head is controlled by a yoke 134 fixed on the shaft 106 and consequently adapted to be operated by the lever 117. When the projection 114 on the disc 115 moves outwardly the roll 116 on the rocking lever, the yoke 134 will be forced toward the left in Fig. 28 carrying with it the head 133. This head is mounted to slide in a fixed bracket 135 which carries two spring-pressed brake blocks 136 serrated on their ends and adapted to be engaged by a serrated surface 137 on the brake disc 127. When this movement takes place the pin on the brake disc is also withdrawn from its hole 125. Thus these serrated surfaces come together when the papers are being thrown out and prevent rotation of the counter disc 126 driving half a revolution of the counter shaft. This interrupts the count for one or more papers without stopping the shaft 123 and always keeps the count correct.

From this it will be seen that full provision is made for throwing out a predetermined number of papers by the operation of a hand controlled means, as the lever 83, which sets the mechanism so that the throw-out device will act automatically by the operation of the machine so as to throw out the desired number of papers and the parts returned to their original position ready for further operation. The parts are operated by simple mechanism applied to the shafts which every folder with a counter has and the counter automatically is caused to skip as many counts as there are papers thrown out and is again set into motion without any attention on the part of the operator.

Improvements are provided in the folding rollers so that the same are self-clearing and move out of the way in case of a choke and means for moving the S-shaped guides so as to assist in the clearing of the folder in case of a choke, thus a space is opened clear down through for the papers to pass through so as to get them out of the machine. The S-shaped guide is restored to normal position and latched in place in a very simple manner and improvements are also made in the throw-out mechanism itself as well as means for supporting and controlling the pinching roller.

Although I have illustrated and described only one form of the invention I am aware of the fact that modifications can be made therein by any person skilled in the art without departing from the scope of the invention as expressed in the claims. Therefore, I do not wish to be limited in this respect but what I do claim is:—

1. In a machine for delivering products, the combination with a throw-out device, and mechanism for operating the throw-out device, of means automatically actuated at a definite period in the cycle of operations of the machine for starting said operating mechanism, and means for automatically restoring the throw-out mechanism to normal inactive position during the same cycle of operations.

2. In a machine for delivering products, the combination with a throw-out device, and mechanism for operating the throw-out device, of means adapted to be set by hand for placing the operating mechanism into position for operation, automatic means actuated at a definite period in the cycle of operations of the machine for starting said operating mechanism, if it is in position therefor, and means for automatically restoring the throw-out mechanism to normal inactive position after a predetermined number of products have been thrown out.

3. In a folding machine, the combination with the folding rolls and a throw-out device for the printed products, of mechanism for moving the throw-out device from inoperative position to a position in the path of the folded products so as to divert them from their normal path, means for setting the throw-out mechanism in position for operation, means connected with the folding machine for operating the throw-out moving mechanism once during the following cycle of operations, and means connected with and operated by the folding machine for restoring the throw-out mechanism to normal inactive condition before the folding machine has completed a cycle of operations for delivery of a plurality of folded products.

4. In a folding machine, the combination with the folding rolls and a throw-out device for the printed products, of mechanism for moving the throw-out device from inoperative position to a position in the path of the folded products so as to divert them from their normal path, a shaft for setting the throw-out mechanism in position for operation, a second shaft for operating the throw-out mechanism, an operating lever loose on the first shaft, means for turning its shaft by said lever, means connected with the folding machine for turning the second shaft during the following cycle of operations, and means connected with and operated by the folding machine for restoring the second shaft to normal inactive condition during said cycle of operations.

5. In a paper throw-out mechanism for a folding machine, the combination with the throw-out fingers, of a hollow shaft or tube connected with the throw-out mechanism for operating it, a shaft extending through said tube, a hand lever loose on the shaft, a ratchet fixed on the shaft, a pawl carried by the lever for operating the ratchet, whereby as the handle is oscillated the ratchet will be turned through a predetermined arc, an arm fixed to the tube and having means for setting the throw-out mechanism into operative position, means for causing the said tube to be turned when the throw-out mechanism is set, and thus operating the throw-out mechanism and means for restoring the tube to normal position after the throw-out mechanism has acted.

6. In a paper throw-out mechanism for a folding machine, the combination with the fan shaft and throw-out fingers, of a hollow shaft or tube connected with the throw-out mechanism for operating it, a shaft extending through said tube, a hand lever loose on the shaft, a fixed cam, a ratchet fixed on the shaft, a pawl carried by the lever for operating the ratchet, the cam having a surface for disengaging the pawl from the ratchet during its operating motion, whereby as the handle is oscillated the ratchet will be turned through a predetermined arc and released, an arm fixed to the tube and having means for setting the throw-out mechanism into operative position, means rotatable with the fan shaft for causing the said tube to be turned when the throw-out mechanism is set, and thus operating the throw-out mechanism, and means for restoring the tube to normal position after the throw-out mechanism has acted.

7. In a throw-out mechanism, the combination with movably mounted throw-out fingers, of a shaft and tube, one inside the other, said tube being positively connected with the throw-out fingers for operating them, an operating lever loosely mounted on the shaft, a ratchet keyed to the shaft, means on the lever for swinging the ratchet and thereby turning the shaft when the lever is swung from one limiting position to another, yielding means for restoring the lever to inactive position, an arm on said shaft, a cam roll connected with said arm and adapted to be moved thereby when the shaft is turned, a cam operated by the machine having a notch which will receive the roller and allow it to move forward, a latch pin movable with said lever, a latch lever normally held in a retracted position by the end of said pin, a spring for turning the latch lever, when the pin is withdrawn from it, and means connected with said latch lever for turning said tube thereby operating the throw-out mechanism.

8. In a throw-out mechanism, the combination with a fan shaft and movably mounted throw-out fingers, of a shaft and tube, one inside the other, said tube positively connected with the throw-out fingers for operating them, an operating lever for operating the shaft, an arm on the end of said shaft, a cam roll latch connected with said arm to be tilted thereby when the shaft is turned, yielding means for forcing said latch back to normal position when it is released, a cam roll lever having a tooth thereon, which the latch engages and holds until released, a spring for swinging said lever in a direction to bring the tooth beyond the latch, a cam roller on said lever, a cam on the fan shaft having a notch which, when the roller is free to engage the surface of the cam, will once in a revolution allow the spring to force the roller forward, a latch pin movable with said lever, means normally held in a retracted position by the end of said pin for operating the throw-out mechanism, and yielding means for actuating said operating means when the pin is withdrawn from it.

9. In a throw-out mechanism for paper folders, the combination of two shafts, hand operated means for swinging the first shaft through a predetermined arc, the second shaft having means for directly operating the throw-out mechanism, a fan shaft, a paper guide operating cam on the fan shaft having a notch in its surface, a cam roller lever having a cam roll thereon adapted to engage the edge of the cam, a latch for normally holding said lever back and the roller away from the cam, yielding means for forcing the lever over toward the cam, means on the first shaft for forcing the latch away and releasing the lever, a latch lever having means for operating said second shaft for actuating the throw-out mechanism, a spring-pressed latch pin connected to and movable with the cam roller lever for holding the latch lever in inoperative position normally, a spring for operating the latch lever, and a second cam on the cam shaft having means for restoring the latch lever to normal inactive position.

10. In a throw-out mechanism for paper folders, the combination with the fan shaft, of two shafts, one within the other, hand operated means for swinging the first shaft through a predetermined arc, the hollow shaft having means for directly operating the throw-out mechanism, a paper guide operating cam on the fan shaft having a notch in its surface and a projection at the end of the notch, a cam roller lever having a cam roll thereon adapted to engage the edge of the cam, a latch lever having means for operating said hollow shaft for actuating the throw-out mechanism, a latch pin connected to and movable with the cam roller lever for holding the latch lever in inoperative position normally, whereby when the roller enters the notch in the cam the latch pin will be withdrawn and the latch lever will be free to operate, a spring for operating the latch lever, a second cam on the cam shaft having means for restoring the latch lever to normal inactive position, said projection on the paper guide operating cam being adapted to force the roller lever and latch pin back so as to leave the latch pin in a position to prevent the latch lever from operating, said latch pin being spring-pressed.

11. In a throw-out mechanism for a folder, the combination of a pair of parallel shafts, an arm fixed to one of said shafts, a pivot carried by said arm, a second pivot operatively related to the other shaft and at substantially the same distance from it as the first pivot is from the first shaft to constitute a parallel motion, a throw-out mechanism carried by the two pivots, hand operated means for turning the first shaft through a predetermined arc to operate the throw-out mechanism, and a throw-out paper guide hooked over the second shaft extending outwardly and resting on the first shaft for receiving the papers thrown out.

12. In a paper throw-out for a folding machine, the combination with the folding rolls, one having grooves, and the delivery fan, of a set of throw-out fingers adapted normally to rest with their forward ends in said grooves, a pair of shafts having their axes parallel with the folding roll shafts, arms carried by said shafts, a pair of pivots carried by said arms, the axes of the shafts and pivots being arranged substantially in the form of a parallelogram, whereby the turning of one of said shafts will move the throw-out fingers out beyond the surface of the grooved roll to divert the products from the fan, and means automatically operating in connection therewith for retracting the throw-out fingers when a predetermined number of papers have been thrown out thereby.

13. In a paper throw-out for a folding machine, the combination with the folding rolls, one having grooves, and the delivery fan, of a set of throw-out fingers adapted normally to rest with their forward ends in said grooves and out of the path of the folded products, a pair of shafts having their axes parallel with the folding roll shafts, arms carried by said shafts, and a pair of pivots carried by said arms, the axes of the shafts and pivots being arranged substantially in the form of a parallelogram, whereby the turning of one of said shafts will move the throw-out fingers forward with a parallel motion out beyond the surface of the grooved roll to divert a paper from the fan.

14. In a folding machine, the combination with a pair of folding rollers, a delivery fan, guides for directing the products from the rollers to the fan and means whereby said guides will move out of place in case of a choke to clear the folder, of a throw-out mechanism comprising throw-out arms normally located out of the path of the papers and means for moving said arms into the path of the papers between the folding rolls, with a substantially parallel motion, said mechanism comprising two parallel shafts and two parallel pivots, each connected with one of said shafts and both connected with the throw-out arms.

15. In a folding machine, the combination with a pair of folding rollers, a delivery fan, guides for directing the products from the rollers to the fan and means whereby said guides will move out of place in case of a choke to clear the folder, of a throw-out mechanism comprising throw-out arms normally located out of the path of the papers and means for moving said arms into the path of the papers between the folding rolls.

16. In a throw-out mechanism for a folding machine, the combination with folding rollers, one of them having grooves and a set of throw-out guides movable into and out of the grooves in said roller, of a pair of parallel shafts, a parallel motion connection between said shafts and the throw-out guide for moving it into and out of the grooves, one of said shafts having a tube surrounding it, a ratchet having a tooth connected with said shaft, a handle pivotally mounted on said shaft and having a spring-pressed latch for engaging said tooth to turn the shaft, a stationary cam having an inclined depression at the top of said surface, a spring-pressed pin on the handle located transversely and movable along the handle and adapted to engage said cam surface, whereby when the handle is turned in one direction the pin will move up to the incline and withdraw the latch from the ratchet and when it is at the top of the incline will rest in said notch until the handle is forced back and a spring for assisting in forcing the handle back.

17. In a throw-out mechanism for a folding machine, the combination with a folding roll having grooves therein, a throw-out lever of a pair of parallel shafts, one of said shafts having arms extending therefrom and the other shaft having arms pivotally connected with the first named arms, the other shaft having clamps fixed thereto, pivots connected with said clamps, said throw-out lever being connected with said pivots and with the upper shaft of the first mentioned pair, whereby when the two parallel shafts swing on their axes the throw-out guide will move into or out of the grooves in one of the rollers to bring it into and out of operative position.

18. In a folding machine, the combination with a folding couple and a pair of folding rolls for receiving the product therefrom, of a throw-out lever pivotally mounted and movable into a position out of the way and also movable about its pivot into a position between the rolls to receive the products from the rolls and divert them, of a parallel motion connection for operating said throw-out lever.

19. In a folding machine, the combination with a folding couple and a pair of folding rolls for receiving the product therefrom, one of them having a circumferential groove of a throw-out lever pivotally mounted and movable into a position in said groove out of the way and also movable about its pivot in a position to receive the products from the rolls and divert them, of two parallel shafts having arms thereon and pivots on said arms, said pivots being connected with said throw-out lever and a guide connected with one of said shafts near the folding rolls and passing over the other of said shafts for receiving the papers thereon.

20. In a machine for delivering products, the combination with a throw-out device, mechanism for operating the throw-out device, means actuated at a definite period in the cycle of operations of the machine for starting said operating mechanism, and means for automatically restoring the throw-out mechanism to normal inactive position during the same cycle of operations.

21. In a folder, the combination with a fan and its shaft, of a counter and its shaft, gearing connected with the folding mechanism for operating the fan shaft, gearing connected with the fan shaft for operating the counter shaft, a counter disc free on the counter shaft, the gear for running the counter shaft being keyed thereto and having a circular series of perforations, the counter disc provided with a perforation at the same distance from the axis of the shaft, a disc having a pin adapted to pass through the perforation in the counter disc into any one of the perforations in the disc and mounted freely on the shaft of the counter, a paper throw-out latch cam on the fan shaft having a projection on the face thereof, a shaft having an arm adapted to be oscillated by said projection, and a yoke fixed on said shaft and connected with said disc for moving the same to pull the pin out of the hole in the gear when the paper throw-out ratchet cam operates said lever.

22. In a folder, the combination with a fan and its shafts, of a counter and its shaft, gearing connected with the folding mechanism for operating the fan shaft, gearing connected with the fan shaft for operating the counter shaft, a counter disc free on the counter shaft, the gear for running the counter shaft being keyed thereto and having a circular series of perforations, the counter disc being provided with a boss having a perforation at the same distance from the axis of the shaft, a brake disc having a pin adapted to pass through the boss into any one of the perforations in the disc and mounted freely on the shaft of the counter, said brake disc having a serrated surface and being movable along the shaft, a spring-pressed head mounted on the frame and having a serrated face adapted to engage the serrated surface on the brake disc when moved thereagainst, a paper throw-out latch cam on the fan shaft having a projection on the face thereof, a shaft having an arm adapted to be oscillated by said projection, and a yoke fixed on said shaft and connected with said brake disc for moving the same against the serrated block to stop the brake disc and the counter disc and to pull the pin out of the hole in the gear when the paper throw-out ratchet cam operates said lever.

23. In a folder, the combination with a fan and its shaft, of a counter and its shaft, gearing connected with the folding mechanism for operating the fan shaft, gearing connected with the fan shaft for operating the counter shaft, said counter comprising a disc on the counter shaft having a notch therein, a counting device having a shaft provided with an arm and a roller on the shaft engaging the counter disc to be actuated by the notch, said counter disc being free on the counter shaft, the gear for running the counter shaft being keyed thereto and having a flange provided with a circular series of perforations, a counter disc provided with a boss having a perforation at the same distance from the axis of the shaft, a brake disc having a pin adapted to pass through the boss into any one of the perforations in the disc and mounted freely on the shaft of the counter, said brake disc having a serrated surface and being movable along the shaft, a spring-pressed head mounted on the frame and having a serrated face adapted to be inserted in the serrated surface on the brake disc when moved thereagainst, a paper throw-out latch cam on the fan shaft having a projection on the face thereof, a shaft having an arm adapted to be oscillated by said projection, and a yoke fixed on said shaft and connected with said brake disc for moving the same against the serrated block to stop the brake disc and the counter disc and to pull the pin out of the hole in the gear when the paper throw-out ratchet cam operates said lever.

24. In a folding machine comprising a folding cylinder and a cutting cylinder, the combination with said folding and cutting cylinders, of a roller spaced from the cutting cylinder, gearing for driving said roller from the folding couple, a pair of movably mounted brackets on opposite sides of the machine, anti-friction bearings carried by said brackets for supporting said roller, yielding means for moving said brackets to bring the roller toward the cutting cylinder and an adjustable stop for limiting said motion.

25. In a folding machine, the combination with a folding couple, comprising a folding cylinder and a cutting cylinder, of a pair of plates mounted on the frame of the machine and adjustable out and in toward the center of the cutting cylinder, a pair of supports carried by said plates at opposite ends of the machine, a roller carried by said supports in position to engage the web coming to the folding couple but out of contact with the cutting cylinder, said plates being connected with the frame of the machine by shear pins and capable of moving in case of a choke sufficient to break the shear pins.

26. In a folding machine, the combination with a frame and a folding couple comprising a folding cylinder and a cutting cylinder, of a pair of slides adjustable radially with respect to the cutting cylinder on the frame, means for holding said pair of slides in adjusted position, a pair of shear pins mounted on said slides, plates connected with said slides to which plates the shear pins pass, means for holding the plates down on the frame but permitting them to move if the shear pins shear off and means carried by said plates for supporting a roller near the cutting cylinder but out of contact therewith, said rollers directing the web of paper out from a direct path to the folding couple.

27. The combination with a folding couple, comprising a folding cylinder and a cutting cylinder, of a roller pivotally supported above the cutting cylinder but spaced therefrom for directing the web of paper out from a direct path to the folding couple, yielding means above the pivot for forcing the roller toward the cutting cylinder, and an adjustable stop connected with the yielding means for limiting the motion of the yielding roller toward the cutting cylinder.

28. The combination with a folding couple and a yieldingly mounted roller engaging the web, of pivoted brackets on which said yielding roller is mounted, a lever bracket pivoted on one of said brackets, a lever pivoted on the lever bracket, a spring for normally swinging said lever toward the roller, and a creasing roller mounted on said lever and free to turn on its axis and normally pressing against the yieldable roller.

29. In a folding machine, the combination with a folding couple, of a pair of supports mounted adjacent to the cutting cylinder of said couple, a pair of brackets pivoted to said supports, a roller carried by said brackets, means for yieldingly holding said roller and brackets to a position adjacent to but out of engagement with the cutting cylinder, a lever pivoted on one of said brackets, yielding means connected with one of said supports for yieldingly pushing the lever toward the roller and limiting its motion in that direction and a pinching or creasing roll carried by said lever and moved by the yielding means into contact with the yielding roller to crease the edge of a folded web.

30. In a folding machine, the combination with a folding couple and a pair of supports carried by the frame adjacent to the cutting cylinder thereof, of a pair of brackets pivoted on said supports at the opposite sides of the machine, a roll carried in bearings on said brackets and extending across the machine adjacent to the cutting cylinder, a bracket pivoted on one of the first named brackets near its point of pivotal support, a lever pivoted on the first named bracket at a point remote from its pivot, a stud carried by the lever, a pinching roll freely rotatable on the stud and in contact with the first named roller, and a spring extending from the free end of said lever to a point near the pivot of the second named bracket to hold the pinching roll in position.

31. In a folding machine, the combination with a folding couple and a pair of supports carried by the frame, of brackets pivoted on said supports, a roll carried by said brackets, a bracket pivoted on one of the first named brackets, a lever pivoted on the first named bracket at another point, a stud carried by the lever, a pinching roll freely rotatable on the stud and in contact with the first named roller, and a spring to hold the pinching roll in position.

32. In a machine for delivering products, the combination with a throw-out device, and mechanism for operating the throw-out device, of means for placing the operating mechanism into position for operation, means for starting said operating mechanism, and means for restoring the throw-out mechanism to normal inactive position after a predetermined number of products have been thrown out.

33. In a machine for delivering products, the combination with a throw-out device, and mechanism for operating the throw-out device, of means for placing the operating mechanism into position for operation, automatic means actuated at a definite period in the cycle of operations of the machine for starting said operating mechanism, if it is in position therefor, and means for restoring the throw-out mechanism.

34. In a machine for delivering products, the combination with a throw-out device, and mechanism for operating the throw-out device, of means adapted to be set by hand for placing the operating mechanism into position for operation, means for starting said operating mechanism, if it is in position therefor, and means for automatically restoring the throw-out mechanism to normal inactive position.

35. In a folding machine, the combination with a folding machine and a throw-out device for the printed products, of mechanism for moving the throw-out device from inoperative position to a position in the path of the folded products so as to divert them from their normal path, means for setting the throw-out mechanism in position for operation, means for operating the throw-out moving mechanism once during the following cycle of operations, and means for restoring the throw-out mechanism to normal inactive condition before the folding machine has completed a cycle of operations for delivery of a plurality of folded products.

In testimony whereof I have hereunto affixed my signature.

HENRY A. WISE WOOD.